(12) United States Patent
Brombach

(10) Patent No.: US 11,641,115 B2
(45) Date of Patent: May 2, 2023

(54) CONVERTER-BASED GENERATORS AND METHOD FOR FEEDING IN ELECTRICAL POWER

(71) Applicant: Wobben Properties GmbH, Aurich (DE)

(72) Inventor: Johannes Brombach, Berlin (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/406,923

(22) Filed: Aug. 19, 2021

(65) Prior Publication Data

US 2022/0060024 A1   Feb. 24, 2022

(30) Foreign Application Priority Data

Aug. 20, 2020 (EP) .................................... 20192020

(51) Int. Cl.
 *H02J 3/46* (2006.01)
 *H02J 3/38* (2006.01)

(52) U.S. Cl.
 CPC .............. *H02J 3/381* (2013.01); *H02J 3/466* (2020.01); *H02J 2300/28* (2020.01)

(58) Field of Classification Search
 CPC ........ H02J 3/381; H02J 3/466; H02J 2300/28; H02J 3/46; Y02E 10/76
 See application file for complete search history.

(56) References Cited

U.S. PATENT DOCUMENTS

| 10,862,308 | B2  | 12/2020 | Brombach |            |
|------------|-----|---------|----------|------------|
| 11,067,059 | B2  | 7/2021  | Brombach |            |
| 2010/0109328 | A1* | 5/2010 | Li ........................... | F03D 9/255 |
|            |     |         |          | 290/44     |
| 2010/0320762 | A1* | 12/2010 | Letas ...................... | F03D 9/255 |
|            |     |         |          | 290/44     |
| 2011/0101689 | A1* | 5/2011 | Larsen .................... | H02P 29/50 |
|            |     |         |          | 363/39     |
| 2012/0104756 | A1* | 5/2012 | Beekmann .............. | H02J 3/381 |
|            |     |         |          | 290/44     |

FOREIGN PATENT DOCUMENTS

| DE | 102017112944 A1 | 12/2018 |
| DE | 102017113006 A1 | 12/2018 |

\* cited by examiner

*Primary Examiner* — Lincoln D Donovan
*Assistant Examiner* — Alex W Lam
(74) *Attorney, Agent, or Firm* — Seed IP Law Group LLP

(57) ABSTRACT

Provided is a method for feeding electrical power into an electrical supply network having a network voltage with a network frequency by means of a converter-based generator, in particular by means of a wind power system, comprising the following steps: estimating a converter proportion, representing a ratio of power fed in by means of converters to total power fed in, of a network section of the electrical supply network, feeding electrical power into the electrical supply network in a normal mode, and activating at least one support control for supporting the electrical supply network. The activating is effected depending on the converter proportion, the at least one support control is adjustable in each case by way of a degree of activation, and the degree of activation of the at least one support control is dependent in each case on the estimated converter proportion.

25 Claims, 3 Drawing Sheets

CONVERTER-BASED GENERATORS AND METHOD FOR FEEDING IN ELECTRICAL POWER

BACKGROUND

Technical Field

The present invention relates to a method for feeding electrical power into an electrical supply network by means of a converter-based generator, in particular by means of a wind power system. The invention also relates to a wind power system for feeding electrical power into an electrical supply network.

Description of the Related Art

It is known to feed electrical power into an electrical supply network by means of converter-based generators, such as wind power installations or wind farms. In this case, the proportion of such converter-based generators is increasing in many electrical supply networks. As a result, converter-based generators are acquiring increasing importance for supporting the electrical supply network.

In this case, it has been recognized that converter-based generators must in this case increasingly perform a network support task that hitherto has been performed by large power plants that feed into the electrical supply network by means of directly coupled synchronous generators. Not only is there a difference in the type of support by directly coupled synchronous generators, on the one hand, and converter-based generators, on the other hand, but also the behavior of the electrical supply network changes overall.

In order to take that into account, the patent application US 2020/0119560 A1, for example, proposes estimating a converter proportion of a network section of the electrical supply network in order to adapt the infeed of the electrical power thereto. Depending on the estimated converter proportion, an adaptation of the controller that controls the infeed can be provided. In particular, the dynamic range of the controller can thus be adapted to this network property.

However, it has now further been recognized that the proportion of converter-based infeed apparatuses can fluctuate greatly. An estimated converter proportion can thus vary continuously. That can additionally have effects on the stability of the electrical supply network.

An additional factor then is that the stability of the electrical supply network can also be ensured by different support measures depending on the converter proportion in the electrical supply network. What can be problematic, in particular, is that it is necessary to react very differently to indicators of a potentially imminent loss of stability depending on the situation. In particular, here the same indicator, such as a fluctuating frequency, for example, may nevertheless necessitate different support measures. If the incorrect support measure is chosen, there is the risk that the potentially imminent loss of stability will not be counteracted, rather that the situation may become even worse.

In the European priority application the European Patent Office has searched the following prior art documents: DE 10 2017 113 006 A1 and DE 10 2017 112 944 A1.

BRIEF SUMMARY

As described herein, using converter-based generators, which may synonymously also be referred to as converter-based infeed apparatuses, a network stabilization is achieved despite varying network properties.

A method is proposed. This method concerns a method for feeding electrical power into an electrical supply network having a network voltage with a network frequency by means of a converter-based generator. The converter-based generator thus uses at least one converter, that is to say a frequency converter or a frequency inverter, which may also be referred to simply as converter or inverter, in order to feed into the electrical supply network. In particular, by means of said at least one converter, a current to be fed in is directly generated or prepared according to amplitude, frequency and phase for feeding into the electrical supply network. The at least one converter thus directly generates an infeed current.

The converter-based generator can be a wind power system, in particular. In this case, a wind power system is a collective term encompassing both a single wind power installation which on its own feeds into an electrical supply network, and a wind farm comprising a plurality of wind power installations which feed into an electrical supply network jointly via a network connection point. Provision can also be made of at least one electrical storage device (battery) in the converter-based generator, from which electrical power is fed into the electrical supply network.

To that end, it is proposed to estimate a converter proportion of a network section of the electrical supply network. In this case, the converter proportion is a ratio of power fed in by means of converters to total power fed in. Thus, to mention a simple illustrative example, if the network section has as generator only one power plant with a directly coupled synchronous generator and a wind farm, wherein the power plant and the wind farm each feed the same amount of power into the electrical supply network, then in this case the converter proportion has the value 0.5 or 50%.

Methods for estimating a converter proportion are described in the document US 2020/0119560 A1 already cited and these estimating methods can also be used here. Estimating the converter proportion of a network section is effected in particular such that the power fed into said network section by means of converters is related as a ratio to total power fed into said network section.

It is then proposed to feed electrical power into the electrical supply network in a normal mode by means of the converter-based generator. In this normal mode, the converter-based generator, namely in particular a renewable generator, thus operates in a customary manner. Preferably and as far as possible it feeds into the electrical supply network as much power as it can generate from the relevant renewable energy source, that is to say in particular from wind or insolation.

Furthermore, activating at least one support control for supporting the electrical supply network is proposed, wherein the activating is effected depending on the converter proportion, wherein the at least one support control is adjustable in each case by way of a degree of activation, and the degree of activation of the at least one support control is dependent in each case on the estimated converter proportion.

The support control can thus carry out control functions for supporting the electrical supply network, such as, e.g., a voltage-dependent reactive power infeed, or frequency-dependent active power infeed.

It has been recognized, however, that depending on the converter proportion the electrical supply network, which may for simplification and synonymously also be referred to as network, may react differently and that may affect the efficacy of the control functions. Therefore, it is proposed that the support control is not just activated or deactivated depending on requirements, but rather is activated in each case to different extents. The use of the degree of activation is provided for this purpose. Said degree of activation is chosen depending on the estimated converter proportion and can assume different values.

Preferably, it is proposed that the degree of activation has a value profile dependent on the converter proportion, the degree of activation can in each case assume values in a value range of 0 to 100% continuously or in more than two steps, in particular in more than 5 steps. As a result, both a very strong activation, including full activation, can be effected, and also a weak activation, and also values in between. By virtue of a continuous selection possibility, any value between 0% and 100% can be chosen.

Preferably, a degree of activation of 0% corresponds to a deactivation, and a degree of activation of 100% corresponds to a full activation.

Preferably, the support control is distinguished by a transfer function, which may also be referred to as controller transfer function, and the degree of activation is applied as factor to the transfer function. The transfer function mathematically describes the relationship between an input signal and an output signal of the support control or of the controller used in the support control. For example the relationship between frequency and active power if the support control is embodied as frequency-dependent active power control. In the simplest case, the relationship can be static, e.g., can be embodied as a gain factor. However, it can also be a dynamic relationship if, e.g., an integral portion is present. It is also appropriate for the transfer function to be nonlinear. The support control may also be referred to synonymously as support function, denoting specifically the function of the support control.

The activation to different extents can then be achieved simply by multiplying the transfer function by the degree of activation.

Alternatively, it is proposed, if the support control can be realized by a plurality of controller units, that a number of the controller units used for the support control is dependent on the degree of activation, such that the greater number of controller units is used, the greater the degree of activation. This alternative can be chosen if the respective controller unit is changed completely, in particular structurally. Partial activation of the controller unit may then possibly not be appropriate. In return, however, it is then proposed to activate a corresponding number of controller units depending on the degree of activation.

Preferably, it is provided that a potential proportion range for the estimated converter proportion can be classified in a lower, middle and upper proportion range. It has been recognized here in particular that there may be three significant ranges for the converter proportion, which ranges can thereby be taken into account well.

In this case, it is proposed in particular that the lower proportion range lies below a first reference value, the middle proportion range begins at the first reference value and extends as far as a second reference value, which is greater than the first reference value, and the upper proportion range lies above the second reference value. The lower, middle and upper proportion ranges are thus sorted in ascending order as the converter proportion increases.

Three ranges are thus proposed, which are referred to here as proportion ranges. The classification in these three ranges is based on the following insight. In the lower proportion range, the network control can be performed (almost) completely by the conventional power plants, that is to say by the generators that feed into the electrical supply network by means of directly coupled converters. The network is operated substantially just like it always has been. The behavior of the renewable infeed apparatuses, that is to say those which feed into the network by means of converters, is scarcely relevant.

In the middle proportion range, the renewables have a relevant proportion. However, the system control must still consider the interests of the conventional entities. Support measures should include the support effect of conventional power plants since the latter have a proportion that is just as relevant. Here the renewables supplement the properties of the conventional entities.

In the upper proportion range, the renewables are dominant. The system stability is no longer dependent on the remaining conventional power plants. In extreme situations, support measures can even manage without the conventional entities, and even supplant them from the network, such that they may need to be disconnected from the network. Here network states can be permitted for which a large power plant is not designed and which could cause it to implement a self-protective failsafe. One such network state may be, e.g., a correspondingly high frequency gradient. However, that can be accepted in such extreme situations.

What can thus be achieved is that support measures are provided differently for different network properties, namely in particular for different converter proportions in the network section, wherein they are activatable as necessary and adjustably in terms of their level. The support controls are therefore not fixedly installed or fixedly implemented, but rather are activated as necessary.

The lower, middle and upper proportion ranges may also be referred to as normal support range, hybrid support range and converter-dominated support range, respectively, since the type of network support may be dependent on the respective range.

In particular, it is proposed that the first reference value lies in the range of 50-60%, and the second reference value lies in the range of 80-95%. It has been recognized here in particular that still up to a proportion of only 50%, the network control can be performed (almost) completely by the conventional power plants, that is to say that if only half of the power or less is fed in by converters, this normal operation can be assumed. This proportion of 50% can also extend up to 60% depending on further conditions.

With a proportion exceeding that, it has been recognized that the infeed by converters becomes dominant and can be addressed by assuming the middle proportion range. It has been recognized here that at least up to a converter proportion of 80% the remaining proportion of power fed in by directly coupled synchronous generators still has a relevance. In this respect, in the middle proportion range upon the activation of the support control it may be taken into account that although the converters have acquired a certain dominance, the directly coupled synchronous generators still play an important role, or at least must not be disconnected from the network.

This role can be concomitantly taken into account in the middle proportion range. In particular, a frequency predefinition of the network frequency can still be effected here by the directly coupled synchronous generators. In particular, it is taken into consideration here that, in the middle proportion range, although a network support already takes account of the dominant behavior of the converters, a frequency management by the directly coupled synchronous generators can nevertheless be taken as a basis. This also takes account, in particular, of the fact that changes in the power balance are still readable in the frequency, namely as a result of the direct reaction of the directly coupled synchronous generators. Nevertheless, in the middle proportion range, it is taken into account that despite the readability of the power balance in the frequency change, a power support by the directly coupled synchronous generators is weak.

Moreover, it has been recognized that in the case of a very high proportion of power fed in by converters, which proportion can be present starting from 80%, but is present at the latest at 95% or more, a different network behavior is present. In particular, it has been recognized that even a frequency management by the directly coupled synchronous generators, if they are still present at all, is no longer strong. In principle, the upper proportion range can take account of the fact that in the case of such a high converter proportion of more than 80% or even more than 95%, the electrical supply network behaves according to rules that deviate considerably from the rules that are present in the case of dominant or at least relevant directly coupled synchronous generators. In other words, in the case of such a high converter proportion, a network is present which behaves or may behave differently than was the case for earlier networks.

Preferably, it is proposed that the first reference value and/or the second reference value are/is chosen depending on a further network property of the electrical supply network. The estimated converter proportion is thus one property of the electrical supply network and a further network property of the electrical supply network is considered in addition. It has been recognized here in particular that the explained characteristics of the electrical supply network or of the network section are not exclusively dependent on the estimated converter proportion. Implementing the process of taking account of the different proportion ranges is nevertheless expedient and a further dependence can be taken into account by choosing the first reference value and/or the second reference value accordingly.

Preferably, depending on said further network property, the first and/or second reference value(s) are/is selected in each case from a predefined range depending on said further network property. In particular, for this purpose, the range of 50-60% can be used for the first reference value, and the range of 80-95% for the second reference value. Preferably, both the first reference value and the second reference value are selected depending on the further network property. However, consideration is also given to selecting only one of the two reference values depending on the further network property. In particular, said network property can be a load flow measure. The first and/or second reference value(s) are/is accordingly selected depending on a load flow measure. The load flow measure is defined by the fact that it identifies a maximum power flow between the network section and the remaining part of the electrical supply network. The remaining part of the electrical supply network is therefore the electrical supply network in its entirety, but without the network section under consideration.

Power balancing from or to the network section can occur during operation of the electrical supply network. Power then flows from the network section or into the network section, which is referred to here as power flow. This power flow can fluctuate and it can also attain the value zero, specifically if no power balancing between the network section and the remaining part of the electrical supply network is being effected at that moment.

It has been recognized here that the maximum power flow, that is to say the maximum power balancing, constitutes a network property and can influence or characterize the behavior, the characteristic and also the stability particularly of the network section. A positive power flow is then the output of power, namely active power, from the network section into the remaining part of the electrical supply network. It has been recognized here in particular that in the case of network sections with a relevant converter proportion, often a network section with distributed, renewable generators and few consumers is present. Such a network section therefore often exports power. Exactly this property characterizes this network section moreover.

However, it also happens that power is imported, that is to say is fed from the remaining electrical supply network into the network section. Particularly in that case, but also generally, consideration is given to fixing an absolute value as maximum power flow, that is to say to disregarding the sign.

Particularly when considering the absolute value of the power, consideration is also given to fixing as maximum power flow that power flow which is predefined by one or more transfer points between the network section and the remaining part of the electrical supply network. Although it is taken into consideration that the maximally transmittable power predefined in this way is not utilized, nevertheless this may be characteristic of the electrical supply network or the network section. Preferably, the maximum power flow used is a normalized value, namely the power maximally exported or imported by the network section related as a ratio to total power that can be fed into the network section.

It also happens that the network section constitutes the entire electrical supply network, namely in particular if the electrical supply network, and thus the network section, constitutes an island network. Such a self-contained network may be referred to as an island network in particular if the total power that can be fed into the network section and thus into the electrical supply network does not exceed 10 GW.

In the case of an island network, the maximum power flow between the network section and a remaining part of the electrical supply network is thus zero because there is no remaining part of the electrical supply network.

It has been recognized in particular that, therefore, by way of the consideration of the maximum power flow, the presence of an island network can be concomitantly taken into account as well.

It has also been recognized that a high power flow, that is to say if a large amount of balancing power or balancing energy flows to or from the network section, indicates a load balancing by large centrifugal masses, namely by centrifugal masses of directly coupled synchronous generators that are arranged in the remaining part of the electrical supply network. At the very least the kinetic energy stored in such rapidly rotating synchronous generators is high and can accordingly provide support power, namely from outside the network section by way of the compensating power. That can be taken into account in the selection of the first and/or second reference value depending on the load flow measure, that is to say depending on the maximum power flow. In particular, it is proposed to choose the first reference value and/or the second reference value to be all the smaller, the greater the maximum power flow or the greater the load flow measure.

In accordance with one embodiment, it is proposed that with a maximum degree of activation in the middle proportion range, in particular as a support control, an emulation function is activated, which reacts to a frequency change of the network frequency with a power change of fed-in power, wherein the power change as a reaction to the frequency change emulates a behavior of a synchronous machine coupled directly to the electrical supply network. Preferably a virtual centrifugal mass with adjustable mass moment of inertia is used. In particular, this emulation function operates in such a way that the virtual centrifugal mass rotates in a manner corresponding to the present frequency or the emulation function proceeds from a corresponding rotational speed of the virtual centrifugal mass. A network frequency of 50 Hz can be assigned a rotational speed of 50 rps, that is to say 3000 rpm. This virtual centrifugal mass rotating in this way also has a phase angle that rotates together with a phase angle of the network voltage. In the steady state, therefore, no difference angle arises between these two phase angles or said difference angle has the value zero.

If the frequency then changes, by virtue of its increasing, for example, then the phase angle of the network voltage is gradually increased relative to the phase angle of the rotating virtual centrifugal mass. A difference angle arises and, depending on this difference angle, the power infeed is reduced in one case and the reduced power fed in is used in the emulation function to accelerate the virtual centrifugal mass. The kinetic energy of the virtual centrifugal mass increases according to the power used for this purpose. It accelerates accordingly, namely according to this power used for the acceleration and according to the virtual, if appropriate adjustable mass moment of inertia. It thus accelerates on the basis of known physical relationships. As a result, the phase angle of the virtual centrifugal mass can then again be correspondingly tracked to the phase angle of the network voltage. The dynamic range of this tracking is influenced by the selection or, if appropriate, adjustment of the mass moment of inertia.

If the difference angle has an opposite sign, the fed-in power increases and the rotational speed of the virtual centrifugal mass decreases. The proposal thus means that a virtual machine concomitantly runs here, in particular concomitantly runs in a drive-free manner as (fixed) centrifugal mass. As a result, a stabilization of the frequency can be achieved. In the steady state, the difference angle is zero.

In particular, it is proposed that the degree of activation for setting the emulation function rises in the lower proportion range from a small value of a maximum of 10%, in particular 0%, as the converter proportion increases, reaches a maximum value, in particular 100%, in the middle proportion range, and falls again as the converter proportion increases further, and reaches a small value of a maximum of 10%, in particular 0%, in the upper proportion range. In particular, for adjusting the emulation function, the emulation function is multiplied by the degree of activation. As a result, the emulation function is thus activated, namely with different degrees of activation.

It has been recognized here that the emulation function is important in particular in the middle proportion range because here the influence of the directly coupled synchronous generators is weaker and compensates for this by an emulated behavior by means of the emulation function. In the case of the upper proportion range, however, the emulation function is no longer as expedient because the network behaves according to a different rule.

Preferably, use is made of the maximum value, in particular 100%, or at least a large value of at least 80% for the entire middle proportion range, or at least 50% thereof. The small value is 0%, in particular, since said emulation function is thereby deactivated in the ranges in which it is not required. A similar effect can be achieved by means of a very low value. Here and for any other embodiment, preferably a value of up to 10% is designated as a small value.

Additionally or alternatively, it is proposed that, in the middle proportion range, a power change of fed-in power as a reaction to a frequency change has an amplitude at least double the magnitude of that in the case of a frequency-dependent power control operating in parallel without emulation of a synchronous machine for the same frequency change. It has been recognized here in particular that even with a different regulator that does not use emulation, provision can be made for the fed-in power to vary depending on a frequency change. In comparison therewith, it is proposed here that a greater gain is provided, namely an at least doubled increase in the power change depending on a frequency change.

Additionally or alternatively, it is proposed that, in the middle proportion range, for a power change of fed-in power as a reaction to a frequency change, no minimum frequency deviation of the network frequency from a reference frequency is predefined, or that a predetermined minimum frequency deviation is at least smaller than in the case of a frequency-dependent power control operating in parallel without emulation of a synchronous machine. It has been recognized here in particular that with a different regulator that does not use emulation, a customary dead band can be fixed for the frequency. As long as the control is only in the normal mode, that is to say as long as the converter proportion is correspondingly low, a comparatively high tolerance of the electrical supply network to a network frequency fluctuation can be assumed. There is then no need for readjustment. Only if said dead band is left, that is to say if a comparatively large frequency change is present, would there then be a reaction.

For the middle proportion range, it has been recognized that there should be immediate reaction to a frequency change in order thus to satisfy the characteristic of the electrical supply network. Consideration is also given to the dead band range being at least smaller. In particular, it is proposed here that the dead band range of the frequency has a maximum magnitude of half that of the dead band range that is otherwise taken as a basis.

It has been recognized here in particular that a directly coupled synchronous generator reacts to a frequency change and in this case regularly does not know a dead band since the reaction is governed physically. As a result of an increasing converter proportion in the network and thus a correspondingly low proportion of directly coupled synchronous generators in the network, this frequency-dependent reaction of the directly coupled synchronous generators decreases. Accordingly, for the middle proportion range, it is proposed already to react to particularly small frequency changes by means of the converters in order to compensate for a corresponding weaker reaction of directly coupled synchronous generators.

In accordance with one embodiment, it is proposed that with a maximum degree of activation in the middle proportion range, in particular as a support control, a power limitation function for rapid power limitation is implemented, wherein the power limitation function reduces the infeed of electrical power in response to a request signal or request criterion. It has been recognized here in particular that in some cases a rapid power limitation can stabilize the network. Such a rapid power limitation may be relevant in particular if a large consumer is suddenly disconnected from the network. Such a network disconnection can be triggered for example at said consumer by a circuit-breaker or alternatively if a network section with many consumers is disconnected from the network. At that moment the power balance is then abruptly no longer balanced, and said rapid power limitation is proposed in order to address that. It has been recognized in particular that in the case of a corresponding converter proportion that is present in the middle proportion range, these converter-based generators can make a corresponding contribution.

For this limitation, a request signal can be provided, which is transmitted by a network operator, for example, but it can also be the reaction to a network state, in particular to a change in the network frequency. The rapid power reduction can also be effected depending on an absolute frequency, particularly if the network frequency exceeds a predefined upper frequency value or falls below a predefined lower frequency value.

Preferably, it is proposed that an angular acceleration is detected. The network voltage has a phase angle rotating with the network frequency. An acceleration can be detected for said phase angle, which acceleration can also be negative. A frequency change can be derived from this acceleration, which is thus an angular acceleration. It is therefore proposed to carry out the power limitation function depending on such an angular acceleration, namely depending on a positive angular acceleration. To that end, a limit acceleration value can be defined, such that the power limitation function is started as soon as said limit acceleration value is exceeded. The power limitation function can also be implemented as an emulation function. The emulation function described above can be embodied as such a power limitation function.

Furthermore, it is proposed that the reduction of the power is characterized by a reduction time constant, wherein the reduction time constant denotes a time in which the power is reduced by a rated power value, wherein the reduction time constant is less than 2 s, in particular is less than 1 s, and more preferably is less than 0.5 s. If the converter-based generator has a rated power of 4 MW, for example, and the reduction time constant is less than 1 s, for example, then the power can be reduced from the rated power value of 4 MW to zero in less than 1 s. In this respect, the reduction time constant specifies a dynamic range of the reduction. In illustrative terms, it specifies a slope steepness for the reduction of the power. In this case, said slope steepness is not dependent on the amplitude of the absolute reduction.

In other words, staying with the above example, if the reduction time constant is less than 1 s, and if the power is reduced only by 2 MW in the example mentioned, then this is effected in a time of less than 0.5 s.

It has also been recognized here in particular that such a rapid reduction is possible with a converter-based generator.

In particular, it is proposed that the degree of activation for adjusting the power limitation function rises in the lower proportion range from a small value of a maximum of 10%, in particular 0%, as the converter proportion increases, reaches a maximum value, in particular 100%, in the middle proportion range, and falls again as the converter proportion increases further, and reaches a small value of a maximum of 10%, in particular 0%, in the upper proportion range. Preferably, for adjusting the power limitation function, the power limitation function is multiplied by the degree of activation. Here, too, as explained above, it has been recognized that the power limitation function is expedient for the middle proportion range.

The multiplication by the power limitation function can have the effect, in particular, that the power is reduced to a correspondingly lesser extent in the case of degrees of activation of below 100%. Thus, the slope becomes shallower and the limitation becomes slower. The same result can also be achieved by dividing the time constants chosen by the degree of activation. If the degree of activation is 0%, the value infinitely results (mathematically) for the relevant time constant, and that then corresponds to a deactivation of the rapid power limitation. A partial activation, that is to say an activation with a value below 100%, can have the result that a limitation—which will also be described below—that attains a negative value then possibly does not actually attain said negative value. However, the corresponding limitation is then nevertheless still present, but its function is reduced by the degree of activation. The same applies to the case when the reduction of the fed-in power is more rapid than the reduction of the power generation. This also applies to the case of a 100% activation, that is to say if the degree of activation is 100%.

If a wind power system, that is to say a wind power installation or a wind farm, is used as converter-based generator, then in accordance with one variant it is proposed that the reduction of the fed-in power is more rapid than a reduction of power generated from wind by means of the wind power system. In the case of a limitation process of a wind power installation, the power reduction can be effected such that the rotor blades are rotated out of the wind in the direction of the feathering position. As a result, the power drawn from the wind is reduced and the power fed into the electrical supply network can accordingly be reduced as well.

Although this process is still very rapid in comparison with the reduction of large power plants, it nevertheless requires a certain time. It is proposed that the power limitation function in the middle proportion range is configured such that the power is reduced even more rapidly, however. That can be done in particular by too much power generated from wind in this case being consumed within the wind power installation. The same applies to a wind farm, in which a plurality of wind power installations simultaneously reduce their power. The power is thus reduced by adjustment of the rotor blades and additionally by consumption of power.

Additionally or alternatively, it is thus proposed that for reducing the fed-in power in the case of this power limitation function with a maximum degree of activation in the middle proportion range, power is additionally consumed in the wind power system, in particular by means of a chopper circuit. A chopper circuit is known in principle; it can dissipate electrical power from a DC link circuit by virtue of the fact that, by means of pulsed driving, current flows from said DC link circuit through a resistor and is converted into heat there. It is proposed here to concomitantly include this power consumption in the configuration of the power limitation function. In particular, the power limitation function proposed here for the middle proportion range, by way of a power predefinition, can predefine the power, that is to say the power fed into the electrical supply network, and thus also predefine its reduction. The reduction is therefore predefined in such a way that it can only be realized if power is additionally consumed in the wind power system.

Additionally or alternatively, for this power limitation function with a maximum degree of activation in the middle proportion range, it is proposed that the fed-in power is reduced to a value below zero, such that the wind power system draws power from the electrical supply network, and consumes it in particular, at least partly, by means of a chopper circuit. However, other consumers in the wind power installation or the wind farm can also be used for consuming electrical power. By way of example, the rotor blades of the wind power installations can be heated even though there is no reason for that on the basis of the outside temperature, to mention one example. Here, too, the power limitation function of the middle proportion range is thus embodied accordingly, namely in such a way that it can also predefine negative values for the infeed. In particular, it can predefine a power reduction that, from a positive fed-in power value, controls a reduction down to negative values of the fed-in power.

In accordance with one configuration, it is proposed that with a maximum degree of activation in the middle proportion range, in particular as a support control, a frequency gradient control is activated, wherein the frequency gradient control alters the power infeed depending on a frequency change, in particular predefines a portion of the fed-in power proportionally to the frequency change. It has been recognized here in particular that such a control of the fed-in power depending on the frequency change is advantageous particularly in the middle proportion range. In the middle proportion range, the number of directly coupled synchronous generators connected to the network section is still high enough that the frequency and a frequency change have good meaningfulness with respect to a power change.

At the same time, however, the converter proportion is already so high that the converter-based generators are afforded great importance for the power control. In this case, it has been recognized that for this purpose a particularly rapid frequency-dependent power control is expedient and can be achieved by the power infeed being altered depending on the frequency change. By detecting the frequency change, in particular by detecting a frequency gradient, it is thus possible not only to detect an absolute frequency deviation, that is to say the deviation of the network frequency from a rated network frequency, or other reference frequency, but also to detect a change and thus also the rapidity of the alteration.

Preferably, such a detection of a frequency change is not based on a dead band of the absolute frequency deviation. That is to say that if there is a rapid change in the frequency itself at the rated point or proceeding from the rated point, that is to say at the rated frequency or in direct proximity to the rated frequency, this can be taken into account by said frequency gradient control. A power adaptation can then be implemented, even before the frequency leaves a dead band range. This control can thus already respond before a control that considers an absolute deviation of the frequency becomes active, if a dead band is present.

A frequency-dependent power control and a frequency gradient control can act simultaneously if, for example, a portion of the available power change is used for the frequency-dependent control of the power and a remaining portion of the variable power is used for the frequency gradient control.

Preferably, it is proposed that the degree of activation for adjusting the frequency gradient control rises in the lower proportion range from a small value of a maximum of 10%, in particular 0%, as the converter proportion increases, reaches a maximum value, in particular 100%, in the middle proportion range, and falls again as the converter proportion increases further, and reaches a small value of a maximum of 10%, in particular 0%, in the upper proportion range. As a result, the frequency gradient control can be applied to the middle proportion range in a focused manner.

In particular, it is proposed that for adjusting the frequency gradient control, the frequency gradient control is multiplied by the degree of activation. For this purpose, therefore, in a simple manner for the proportional activation of the power infeed that is altered depending on a frequency gradient, the power value of said power infeed can be multiplied by the degree of activation.

In accordance with one embodiment, it is proposed that with a maximum degree of activation in the upper proportion range, in particular as a support control, a frequency-dependent power control is activated, in which the fed-in power is altered depending on the network frequency in accordance with a predetermined control specification, and the control specification has a control gain and/or is characterized by a control speed, which are altered depending on the converter proportion and/or depending on a or the load flow measure. In particular, the control gain is adjusted to be all the greater, the greater the converter proportion, and/or the control speed is adjusted to be all the more rapid, the greater the converter proportion.

Preferably, the relationship between control gain and/or control speed and the converter proportion is altered depending on the load flow measure. In particular, an increase in the control gain depending on the converter proportion can be related by way of a proportionality factor, that is to say can be embodied as a ramp. Said proportionality factor or a gradient of the ramp can then be altered depending on the load flow measure. It is proposed here in particular that the proportionality factor or the gradient of the ramp is all the greater, the smaller the load flow measure. The same applies to the control speed, which can be adjusted depending on the converter proportion and depending on the load flow measure in the same way as the control gain.

It has been recognized here in particular that the frequency-dependent adjustment of the power is adjusted to a greater extent, the greater the converter proportion and the smaller the load flow measure. Particularly in an island network, the absolute value of the load flow measure is small, the load flow measure specifically being zero. Here there can be no compensation by adjacent network sections, and so the network-frequency-dependent power adjustment has to react to a correspondingly greater extent in order to compensate for the control possibility as a result of the absent load flow or absent power flow. Likewise, the frequency-dependent adjustment of the power should turn out to be all the greater, that is to say to have a gain that is all the greater, the higher the converter proportion, in order specifically to have a corresponding control capability by means of few or even no directly coupled synchronous generators.

In accordance with one configuration, it is proposed that with a maximum degree of activation in the upper proportion range and with the use of a wind power system, in particular as a support control, an instantaneous reserve control is activated, in which depending on the network frequency, at values of the network frequency below a lower frequency reference value, kinetic energy is drawn from at least one rotating rotor and fed into the electrical supply network. It is thus proposed to provide such an instantaneous reserve control in the upper proportion range, in particular to provide it only or predominantly in the upper proportion range.

It has been recognized here that particularly by means of such an instantaneous reserve control it is possible to provide a compensation for the reduced frequency stabilization as a result of the small proportion of directly coupled synchronous generators at this network section. In particular, provision is made for the instantaneous reserve control to be activated as the network frequency falls.

In particular, it is proposed that the degree of activation for adjusting the instantaneous reserve control and/or the frequency-dependent power control has a small value of a maximum of 10% in the lower proportion range, in particular 0%, rises in the middle proportion range from a small value of a maximum of 10%, in particular 0%, as the converter proportion increases, in particular rises only starting from a proportion range that lies below the second reference value by a maximum of 10%, and reaches a maximum value, in particular 100%, in the upper proportion range, and maintains its maximum value as the converter proportion increases further up to 100%. As a result, the activation is prepared, in particular by the value profile of the degree of activation, in such a way that the instantaneous reserve control is greatly or fully activated in particular in the upper proportion range, that is to say for large converter proportions.

In particular, it is proposed that for setting the instantaneous reserve control or the frequency-dependent power control, the instantaneous reserve control or the frequency-dependent power control is multiplied by the degree of activation.

It can thus be provided in particular that a maximum activation is effected only in the case of a very high converter proportion in the network. The application of the degree of activation can mean here that a relationship between the frequency deviation by which the network frequency lies below the lower frequency reference value and the power which, depending on that, is additionally fed into the electrical supply network can be characterized by a gain relationship, in particular gain factor, in particular proportionality factor. For this gain relationship, gain factor or proportionality factor, a maximum value can be provided and that is adjusted if the degree of activation is 100%. In particular, this gain relationship can be chosen proportionally to the degree of activation.

In accordance with one embodiment, it is proposed that with a maximum degree of activation in the upper proportion range, in particular as a support control, an inertial angle control is activated, wherein the inertial angle control operates a reference system, in which a virtual centrifugal mass rotates with a rotational speed corresponding to the network frequency, and that is used to derive a reference signal with a reference frequency and a phase angle in relation to the network voltage, wherein the rotation of the virtual centrifugal mass follows a change of the network frequency only sluggishly, such that the phase angle of the reference signal varies as the network frequency changes, and the inertial angle control controls a power infeed depending on the phase angle of the reference signal. In particular, it is proposed that a portion of the fed-in power is controlled proportionally to the phase angle. The fact that the rotation of the virtual centrifugal mass follows a change in the network frequency only sluggishly is realized by the fact that it follows the change in the network frequency with a delay function. The delay function can be a first-order delay function, in particular.

It has been recognized here in particular that by virtue of this inertial angle control in the upper proportion range, the converter-based generator can be adapted to the behavior of a directly coupled synchronous generator. In the case of the upper proportion range, a very high converter proportion is present, in the case of which only a few or even no directly coupled synchronous generators feed into the network section, and so their physically governed stabilization effect is omitted, at the very least greatly reduced. That can be at least partly compensated for by such an inertial angle control, which is thus proposed particularly for the upper proportion range.

In particular, it is proposed that the virtual centrifugal mass is characterized by a moment of inertia, which is adjustable, and that the delay function has a ramp-up time constant that is proportional to the moment of inertia. If the moment of inertia is thus chosen with double the magnitude, for example, then the ramp-up time constant of the delay function also has double the magnitude. In other words, the behavior of the virtual centrifugal mass and thus the reference system and thus the inertial angle control overall are twice as sluggish. As a result, a behavior of a directly coupled synchronous generator can be emulated and even behaviors with varying sluggishness can be taken into account. Preferably, the adjustable moment of inertia is adjusted depending on the magnitude of the proportion of directly coupled synchronous generators in the network section. To that end, it is proposed that the moment of inertia is chosen to be all the greater, the smaller the proportion of directly coupled synchronous generators in the network section. As a result, the absence of directly coupled synchronous generators can be compensated for to a correspondingly great extent. That can be achieved by way of the degree of activation, which can be multiplied by the moment of inertia.

In particular, it is proposed that the degree of activation for adjusting the inertial angle control has a small value of a maximum of 10%, in particular 0%, in the lower proportion range, rises in the middle proportion range from a small value of a maximum of 10%, in particular 0%, as the converter proportion increases, reaches a maximum value, in particular 100%, in the upper proportion range, and maintains its maximum value as the converter proportion increases further up to 100%.

Preferably, for setting the inertial angle control, the inertial angle control can be multiplied by the degree of activation. The inertial angle control also has a transfer function, particularly one which reproduces a relationship between frequency change and fed-in power. The degree of activation can be multiplied by such a transfer function.

In particular, it is proposed that the moment of inertia is chosen depending on an operating point of the converter-based generator, in particular that it is chosen depending on the fed-in power. Its operating point can be wholly or partly defined by the power fed in by the converter-based infeed apparatus, and so the consideration of the fed-in power is proposed. When considering the fed-in power, it is possible for the power additionally fed in by the inertial angle control to be extracted computationally, such that only the power corrected in this way is considered, in particular the power that is fed in before the inertial angle control becomes active. This makes it possible to prevent an unstable control from occurring in which the inertial angle control leads to a higher power leading to an increased moment of inertia, which in turn increases the power further. However, the unstable control can also be avoided by means of a suitable parameterization.

It has been recognized here in particular that what can be achieved by the adaptation of the virtual moment of inertia to the operating point is that the inertial angle control is all the greater, the greater the fed-in power, that is to say the more influential the converter-based infeed apparatus is at that moment. In particular, it is therefore proposed to choose the moment of inertia to be all the greater, the greater the power fed in by the converter-based infeed apparatus.

In accordance with one configuration, it is proposed that with a maximum degree of activation in the upper proportion range, in particular as a support control, a power infeed dependent on the network voltage is provided, which predefines and feeds in the fed-in power or a portion thereof depending on a voltage deviation of the network voltage from a reference voltage, in particular depending on a rated network voltage. It has been recognized here in particular that this power infeed dependent on the network voltage is provided for the upper proportion range if the proportion of directly coupled synchronous generators in the network section is low. Directly coupled synchronous generators usually also have voltage impressing properties. As a result of the low proportion of directly coupled synchronous generators in the network section, this voltage impressing property is thus attenuated as well. That can be at least partly compensated for by this network-voltage-dependent power infeed. A voltage stabilization can thus be achieved by means of the network-voltage-dependent power infeed.

It is pointed out that an active power infeed dependent on the network voltage is proposed here. The network voltage can thus be stabilized overall or even be predefined. That differs in particular from a network-voltage-dependent reactive power infeed—which can additionally be provided—, which rather influences a network voltage in relation to a specific, in particular long, line, namely in particular compensates for a voltage drop along this long line.

In particular, it is proposed that a power portion of the fed-in power proportional to the voltage deviation is predefined and fed in. In principle, power, that is to say active power, is intended to be fed in even if no voltage deviation is present, that ultimately being the purpose of a generator. For voltage support, however, it is proposed that a portion of the fed-in power, namely the power portion mentioned, is used for this control purpose and the power portion proportional to the voltage deviation is thus predefined and fed in. That is then thus added to or subtracted from the active power otherwise fed in, depending on the sign. In particular, a rapid reaction to voltage deviations can be achieved by means of the predefinition proportional to the voltage deviation. Preferably, it is proposed that additionally a further portion of the fed-in power depending on an integral portion of the voltage deviation is predefined and fed in. What is thus proposed here is that the voltage deviation is integrated over time at least partly or taking account of limit values. Depending on that, in particular proportionally thereto, the further portion of the fed-in power is predefined and fed in. As a result, steady-state voltage deviations can also be permanently corrected.

Preferably, it is proposed that the degree of activation for adjusting the power infeed dependent on the network voltage has a small value of a maximum of 10%, in particular 0%, in the lower proportion range, rises in the middle proportion range from a small value of a maximum of 10%, in particular 0%, as the converter proportion increases, in particular rises only starting from a proportion range that lies below the second reference value by a maximum of 10%-20%, reaches a maximum value, in particular 100%, in the upper proportion range, in particular reaches it only starting from a proportion range of 90%. Thus, this power infeed that is dependent on the network voltage is provided in particular for the upper proportion range, and even there is activated gradually only as the converter proportion rises.

Preferably, for adjusting the power infeed dependent on the network voltage, the power infeed dependent on the network voltage is multiplied by the degree of activation. Here in particular the transfer function and/or the power predefined thereby can be multiplied by the degree of activation.

In accordance with one configuration, it is proposed that with a maximum degree of activation in the upper proportion range, in particular as a support control, a reactive power infeed dependent on the network voltage is provided, which predefines and feeds in the fed-in reactive power or a portion thereof depending on a voltage deviation of the network voltage from a reference voltage, in particular depending on a rated network voltage, wherein at least one portion of the fed-in reactive power depending on an integral portion of the voltage deviation, in particular proportional thereto, is predefined and fed in.

It has been recognized here in particular that it is advantageous if this reactive power infeed is used in the upper proportion range if there are hardly any generators present which guide the network voltage to a target voltage value, with the result that the voltage is then no longer guided, or is then still guided poorly, to the predefined voltage value, in particular to the rated voltage. Known voltage support measures implemented by wind power installations respond only outside a tolerance band and cannot achieve steady-state accuracy. They can at best return the voltage to the tolerance band, but generally not to the target voltage value. This situation can be improved by the control now proposed.

Preferably, it is proposed that the degree of activation for adjusting the reactive power infeed dependent on the network voltage has a small value of a maximum of 10%, in particular 0%, in the lower proportion range, rises in the middle proportion range from a small value of a maximum of 10%, in particular 0%, as the converter proportion increases, in particular rises only starting from a proportion range that lies below the second reference value by a maximum of 10%-20%, reaches a maximum value, in particular 100%, in the upper proportion range, in particular reaches it only starting from a proportion range of 90%. Thus, this reactive power infeed that is dependent on the network voltage is provided in particular for the upper proportion range, and even there is activated gradually only as the converter proportion increases.

Preferably, for adjusting the reactive power infeed dependent on the network voltage, the reactive power infeed dependent on the network voltage is multiplied by the degree of activation. Here in particular the transfer function and/or the reactive power predefined thereby can be multiplied by the degree of activation.

In accordance with one embodiment, it is proposed that with a maximum degree of activation in the upper proportion range, in particular as a support control, a reserve control is activated, in which a reserve power is reserved as power reserve by virtue of the fact that the converter-based generator is operated by a restriction power. It has been recognized here in particular that the very high converter proportion also usually means that a large portion of the power originates from renewable sources, namely from wind and solar energy, in particular. Such generators traditionally operate in so-called network parallel operation. That means that they feed into the electrical supply network as much power as is possible at that moment on the basis of the renewable energy source, that is to say depending on prevailing wind and the solar power present. Consequently, these systems cannot increase their power, or can do so only under special conditions. That is usually compensated for by directly coupled synchronous generators, which usually belong to non-renewable energy sources and can thus increase their power as necessary, provided that they are not already feeding in maximum power.

This can be compensated for by the converter-based generators being operated in a restricted manner, that is to say being operated such that they keep a reserve power available. Keeping a reserve power available means squandering renewable energy. Therefore, such an operating mode is avoided as much as possible. It has been recognized, however, that such operation may be appropriate in the upper proportion range.

Particularly if the converter-based generator is a wind power system, it is proposed that the latter generates at the level of the restriction power less power from wind than would be possible on the basis of prevailing wind, in order as necessary to leave restricted operation and to increase the fed-in power by the restriction power, or a portion thereof. What is thereby achieved, in particular, is that this power increase is also possible permanently, albeit at the price that power is squandered. Such a disadvantage may be acceptable, however, in order to achieve the stabilization of the electrical supply network. Therefore, it is proposed in particular only in the upper proportion range.

Preferably, it is provided that the degree of activation for adjusting the reserve control rises in the lower proportion range from a small value of a maximum of 10%, in particular 0%, as the converter proportion increases, rises further in value in the middle proportion range as the converter proportion increases, reaches a maximum value, in particular 100%, in the upper proportion range, and maintains its maximum value as the converter proportion increases further up to 100%. As a result, the reserve control can already be activated in the case of small converter proportions, but only with a small amplitude. This means that little energy is then squandered. In the case of very high converter proportions, the activation is then large; in particular, the degree of activation is maximal. Although a large amount of energy is then squandered, in return keeping this reserve power available is then particularly important.

Preferably, for setting the reserve control, the reserve control is multiplied by the degree of activation. The reserve control can have a transfer function by virtue of the reserve power being adjusted depending on a frequency deviation, or simply depending on a request signal. Said transfer function can be multiplied by the degree of activation. Alternatively, the value ascertained for the reserve power can be multiplied by the degree of activation. In accordance with one configuration, it is proposed that with a maximum degree of activation in the upper proportion range, in particular as a support control, a voltage impressing mode is activated, which may synonymously also be referred to as voltage impressing or voltage impressing control. Converter-based generators are usually operated in current impressing fashion. They obtain a target current value and feed the latter into the electrical supply network. Voltage impressing is usually carried out by directly coupled synchronous generators, which have such a voltage impressing property owing to physical causes.

Providing voltage impressing or a voltage impressing mode for converter-based generators can be realized in particular such that a correspondingly different control is implemented, wherein it is possible preferably to alternate between current impressing control and voltage impressing control; consequently, the voltage impressing mode proposed here need not be present permanently, that is to say can be activated and correspondingly also deactivated. In any case the control that leads to this voltage impressing mode can predefine a voltage value and the infeed is then correspondingly controlled such that said voltage value is attained.

It should be taken into consideration here in particular that a voltage impressing mode for a converter-based generator can mean that a very large amount of control power is required. Accordingly, a large amount of control power, that is to say a correspondingly large amount of active power, must also be kept available for this mode. That is indeed possible, but inefficient, and so it is avoided as much as possible. It has been recognized here, however, that in the upper proportion range, in which voltage impressing by directly coupled synchronous generators is present only weakly or is not present at all, this is acceptable in order to be able to ensure a stabilization. Therefore, this voltage impressing mode is proposed in particular in the upper proportion range.

In particular, it is proposed that the converter-based generator has a plurality of inverters for generating in each case a portion of the fed-in power. To that end, it is proposed that upon activation of the voltage impressing mode, at least one of the inverters changes from current impressing operation to voltage impressing operation. In this respect, voltage impressing operation, which here concerns the operation in each case of a single inverter, may alternatively also be referred to as voltage impressing mode of said single inverter.

How many inverters or converter-based generators are operated in the voltage impressing mode can be defined by way of the degree of activation. In particular, their number can be adjusted proportionally to the degree of activation. If the inverters or generators are different, in particular have rated powers of different magnitudes, this variable or their rated power can be concomitantly taken into account upon activation depending on the degree of activation.

What can thereby be achieved in any case is that a voltage impressing mode is activated, but without the entire converter-based generator with all inverters operating only in the voltage impressing mode. Instead, the converter-based generator operates partly in voltage impressing fashion. This is based in particular on the concept that not just one converter-based generator but many converter-based generators, in particular all converter-based generators that feed into this network section, change in part, that is to say one or more of their inverters, to current impressing operation. In terms of the totality of many converter-based generators operating in this way, it is thus possible effectively to achieve voltage impressing and to compensate for the small proportion of directly coupled synchronous generators with regard to voltage impressing.

Preferably, it is proposed that the degree of activation for adjusting the voltage impressing mode has a small value of a maximum of 10%, in particular 0%, in the lower proportion range, has a small value of a maximum of 10%, in particular 0%, in the middle proportion range, rises in the upper proportion range from a small value of a maximum of 10%, in particular 0%, up to a maximum value, in particular 100%, as the converter proportion increases. It is thus proposed to provide the voltage impressing only for the upper proportion range. Even there, however, the voltage impressing is increased gradually as the converter proportion rises, such that the voltage impressing mode is fully activated as far as possible only when the converter proportion has also reached substantially 100%.

As explained above, for adjusting the voltage impressing mode, use can be made of a number of inverters or converter-based generators depending on the degree of activation. In particular, it is proposed that all the more inverters or converter-based generators are used, the greater the degree of activation.

In accordance with one embodiment, it is provided that with a maximum degree of activation in the lower proportion range, in particular as a support control, a damping control is activated.

For this purpose, it is provided that a low-frequency oscillation in the electrical supply network is detected, which denotes in particular an oscillation of an amplitude of the network voltage that has a lower frequency than a rated network frequency. In particular, for illustrative explanation, an oscillation of the root-mean-square value of the network voltage can be present. The low-frequency oscillation can achieve in particular a range of 0.02 Hz to 25 Hz, in particular of 0.1 Hz to 10 Hz.

It is additionally proposed to carry out a damping of the low-frequency oscillation detected. Such a targeted detection of low-frequency oscillation and damping of these oscillations is thus proposed in the lower proportion range and hence in the case of a comparatively low converter proportion.

It has been recognized in particular that such low-frequency oscillations can be caused by synchronous generators directly coupled to the network section. Such directly coupled synchronous generators can oscillate and then lead to such low-frequency oscillations. It has been recognized here that such oscillation is then particularly relevant and possibly even tends toward oscillation build-up if directly coupled synchronous generators are the dominant infeed apparatuses of the network section. It is therefore proposed to use this damping control in the lower proportion range and thus in the case of a low converter proportion and thus a high proportion of directly coupled synchronous generators, and thus to carry out the detection of the low-frequency oscillations and their damping.

It has been recognized here in particular that it may be advantageous for such detection of low-frequency oscillations with subsequent damping not to be carried out in the middle and upper proportion ranges. This is because as a result it is then possible to avoid a situation in which other control concepts that are more important in the middle or upper proportion range are forced into the background or weakened. Moreover, it should be taken into consideration, if low-frequency oscillations occur to a relevant extent even for a high proportion range, that they possibly have other causes and must therefore possibly also be damped differently. In the case of damping in the lower proportion range, it can be assumed in the case of such low-frequency oscillations that they are caused by the directly coupled synchronous generators and the damping can accordingly be adapted thereto.

The damping can be carried out in particular such that electrical power is fed in anticyclically with respect to the low-frequency oscillation detected. In particular, electrical power can be fed in in an oscillating manner by an oscillating power signal being superposed in particular on a basic power fed in, such that the amplitude of the fed-in power oscillates around a value. In this case, this oscillating amplitude oscillates with a frequency which corresponds to the frequency of the low-frequency oscillation and additionally has a phase angle that is shifted relative to a phase angle of the low-frequency oscillation.

The anticyclic oscillation mentioned would thus correspond to a phase shift by 180°. It is a consideration here that an angle of 180° is not ideal, rather the angle can also be in the region of 90°. A suitable angle by which the phase angle of the oscillating power is shifted relative to the low-frequency oscillation in the network in order to obtain a good damping result can be ascertained by simulation.

For the purpose of activation, it is proposed in particular that the degree of activation for adjusting the damping control falls in the lower proportion range, in particular in the case of a converter proportion of 0-10%, from a large value of at least 90%, in particular 100%, as the converter proportion increases, in particular falls to 0-10% while still in the lower proportion range, has a small value of a maximum of 10%, in particular 0%, in the middle proportion range, has a small value of a maximum of 10%, in particular 0%, in the upper proportion range. The degree of activation of 100% at the beginning of the lower proportion range ought as far as possible to have fallen to 0% at the end of the lower proportion range. The damping control can be deactivated in the middle and upper proportion ranges.

Preferably, for adjusting the damping control, the damping control is multiplied by the degree of activation. The damping control can have in particular a transfer function between a detected oscillation amplitude and an amplitude of an oscillating power to be fed in for the damping. Said transfer function can be multiplied by the degree of activation. Consideration is also given to simply multiplying the power signal determined for the damping by the degree of activation.

In particular, it is thus proposed that the emulation function, the power limitation function, the frequency gradient control, the frequency-dependent power control, the instantaneous reserve control, the inertial angle control, the power infeed dependent on the network voltage, the reserve control, the damping control and the voltage impressing mode in each case constitute a support control or support function. Their adjustment, in particular by way of the multiplication by the degree of activation, is thus an adjustment of the support control and thus an activation of the support control with the degree of activation.

In accordance with one embodiment, it is proposed that among the generators that do not use converters for infeed, a dominant type of power plant of the network section is detected, wherein as the type of power plant of generators that do not use converters for infeed, a distinction is drawn at least between a base load power plant and a regulation power plant, in particular a distinction is drawn at least between a nuclear power plant, a coal-fired power plant, a gas-fired power plant and a hydroelectric power plant, and that type of power plant which, among the generators that do not use converters for infeed, can feed the most power into the network section constitutes the dominant type of power plant. A base load power plant is one which supplies a base load, that is to say feeds in a substantially fixed power value for a long period, in particular at least for days, and for said value relatively large changes are provided only over a relatively long period of time. Changes in the fed-in power by more than 50%, relative to rated power, require a time of a plurality of hours. Nuclear power plants, and coal-fired power plants can be regarded as a base load power plant. In contrast thereto, a regulation power plant is one which can rapidly change its power infeed. A change in the power by more than 50%, relative to rated power, is possible in less than one hour, often in a quarter of an hour. Gas-fired power plants and hydroelectric power plants can be regarded as regulation power plants.

As distinction between a base load power plant and a regulation power plant, it is thus also possible to draw a distinction between a nuclear power plant or a coal-fired power plant as base load power plant, on the one hand, and a gas-fired power plant or a hydroelectric power plant as regulation power plant, on the other hand. Explanations are given below concerning the four individual power plants mentioned, which are analogously applicable to a corresponding classification according to base load power plant, on the one hand, and regulation power plant, on the other hand. Features and proposals indicated with respect to a nuclear power plant or a coal-fired power plant are thus also applicable to a base load power plant. Features and proposals indicated with respect to a gas-fired power plant or a hydroelectric power plant are thus also applicable to a regulation power plant.

To that end, it is then proposed that depending on the dominant type of power plant the first or second reference value is selected and/or at least one supplementary control is selected and used.

It is thus firstly proposed to classify the generators in types of power plant that do not belong to the converter-based generators. Therefore, if the converter proportion is 70%, for example, then the generators of the remaining 30% are classified accordingly. Here in particular four relevant types of power plant, which may synonymously also be referred to as power plant types, have been identified, the behavior of which may in part differ fundamentally, such that taking account thereof separately is proposed.

The dominant type of power plant is considered to be the one which can feed in the most power. That is to say that if there is infeed for example by a nuclear power plant with 4 GW rated power and two coal-fired power plants each with 3 GW rated power, and generators that do not feed in by means of converters are not present otherwise, then the type of power plant that constitutes the dominant type of power plant is the coal-fired power plant. However, power that can be fed in is assumed only if the respective power plant is actually also connected to the network section and feeds in electrical power, even if the latter does not have its rated power. However, the rated power can then be regarded as power that can be fed in.

Depending on the dominant type of power plant ascertained in this way, it is then proposed to select the first or second reference value.

Additionally or alternatively, it is proposed that depending on the dominant type of power plant at least one supplementary control is selected and used. By way of example, consideration is also given here to supplementary controls which are provided only or specifically for a proportion range. By way of example, the activation of a voltage impressing mode can be such a supplementary control. The activation of a reserve control can also be the selection and use of such a supplementary control. A power limitation function for rapid power limitation can also be a supplementary control.

In this regard, it has been recognized that a nuclear power plant feeds in a continuous power which as far as possible should not be altered rapidly. The network can thereby be stabilized, but such a nuclear power plant should as far as possible not react rapidly to sudden power changes, for example if a large consumer is suddenly disconnected from the network. Accordingly, particularly if the dominant type of power plant is a nuclear power plant, it is proposed to implement a power limitation function for rapid power limitation. That may be expedient even if such a power plant is operated with its minimum loading, or just above that, which does not permit further limitation. Additionally or alternatively, it is proposed to choose the first reference value rather low and the second reference value rather high, in order that activations of the middle proportion range are rather selected.

A coal-fired power plant behaves rather similarly to a nuclear power plant and can likewise feed in a stable power which in turn may also be altered very slowly. In this case, a coal-fired power plant can still change its mode of operation somewhat more rapidly in comparison with a nuclear power plant, or a rapid change is less harmful to the power plant. Consequently, if the dominant type of power plant is a coal-fired power plant, it is proposed, as in the case of the nuclear power plant, to select rather support controls from the middle proportion range and/or to implement a power limitation function for rapid power limitation. In comparison with the nuclear power plant as the dominant type of power plant, in the case of the coal-fired power plant as the dominant type of power plant, it is preferably possible to perform a controller parameterization, particularly in the case of a rapid power limitation, which leads to a slower reaction. Larger time constants or smaller controller gains can thus be selected.

Both in the case of a nuclear power plant and in the case of a coal-fired power plant as the dominant type of power plant, it is additionally proposed to activate a reserve control in order to be able to react to sudden power changes of consumers in the network. In particular a suddenly increased power demand exceeding the reserve demand provided by the power plants in a simple manner, which can arise as a result of a connected power plant, can thereby be taken into account.

If a gas-fired power plant is the dominant type of power plant, then no reserve control need be provided, since a gas-powered power plant can increase or decrease its power very rapidly, in any case in comparison with a nuclear power plant and a coal-fired power plant, and has a broader band with respect to power flexibility. Furthermore, a stabilizing effect of a gas-fired power plant is possibly greater, and so this effect does not have to be taken over by the converter-based generators until later. It is thus proposed in particular, in the case of a gas-fired power plant as the dominant type of power plant, not to activate a voltage impressing mode, and/or to choose the second reference value to be higher.

From among the abovementioned generators that do not feed in by means of converters, a hydroelectric power plant is the type of power plant which, at least on average, can change its power the most rapidly, wherein here, unlike in the case of the other power plants, a long dead time should be provided. Accordingly, here as well, in a manner similar to that in the case of the gas-fired power plant as the dominant type of power plant, a reserve control can be dispensed with and/or voltage impressing can be provided. In comparison with the gas-fired power plant as the dominant type of power plant, for the hydroelectric power plant as the dominant type of power plant, a controller parameterization can be provided, in principle, which leads to a more rapid controller than in the case of the gas-fired power plant. In order to bridge the dead time, however, it is possible to provide a virtual centrifugal mass provision, or a rapid control power provision in the first seconds, in particular in the first 10 seconds, in particular in the first 5 seconds. That can be achieved in particular by means of the emulation function or the inertial angle control.

Particularly for the lower proportion range, it is proposed that the damping of the low-frequency oscillation is carried out depending on the dominant type of power plant, or depending on a weighting of the power plant types present. In particular the amplitude of an oscillating power that is fed in for the purpose of damping can be adapted depending on the dominant type of power plant. Preferably, it is the highest in the case of a hydroelectric power plant as the dominant type of power plant, the second highest in the case of a gas-fired power plant as the dominant type of power plant, the third highest in the case of a coal-fired power plant as the dominant type of power plant, and the lowest in the case of a nuclear power plant as the dominant type of power plant. Similarly, a difference angle between a phase angle of said oscillating power and the low-frequency oscillation in the network can be adjusted depending on the dominant type of power plant.

It has been recognized in particular that a sensitivity to oscillations may be different for power plants of different power plant types. Hydroelectric power plants may be particularly sensitive because they may experience pressure surges in the water column as a result of the oscillations. Gas turbines may be the second most sensitive because the oscillations may affect compressor pumps and may cause a great acceleration of the blades. The power plant type of gas turbines may also encompass combined cycle power plants (CCPPs), and their sensitivity may be somewhat lower still.

Coal-fired power plants have an even lower sensitivity, and that of nuclear power plants is the lowest among the power plants. Independently of that, the respective size, in particular rated power, of the respective power plant blocks can additionally be taken into account.

Provided is a wind power system, namely a wind power system for feeding electrical power into an electrical supply network having a network voltage with a network frequency, wherein the wind power system is embodied as a converter-based generator, comprising:
- an estimating device (e.g., controller) for estimating a converter proportion of a network section of the electrical supply network, wherein the converter proportion denotes a ratio of power fed in by means of converters to total power fed in,
- an infeed device (e.g., inverter) for feeding electrical power into the electrical supply network in a normal mode,
- a control device (e.g., controller), prepared for activating at least one support control for supporting the electrical supply network, wherein
- the activating is effected depending on the converter proportion, wherein
- the at least one support control is adjustable by way of a degree of activation, and
- the degree of activation of the at least one support control is dependent in each case on the estimated converter proportion.

The infeed device can be embodied in particular as an inverter device that obtains electrical power from wind in a DC link circuit and from the latter feeds it into the electrical supply network. Such an inverter device, in particular together with the DC link circuit and a rectifier for feeding the DC link circuit, thus constitutes a converter. As a result, the wind power system is embodied as a converter-based generator. A converter-based generator may synonymously also be referred to as a converter-based infeed apparatus.

The control device can be embodied in particular as a process computer, and the control device can include the estimating device. The control device comprises in particular controllers or regulators for implementing the respective support control, which can be implemented as software.

Preferably, the wind power system is configured to implement at least one method in accordance with any of the above embodiments of a method for infeed. In particular, it is proposed that the corresponding steps are implemented in the control device. Only the specific implementation of the infeed by the infeed device is not effected by the control device, but rather by a corresponding inverter or converter, which however can be controlled by the control device. The method steps can be implemented in particular as software programs or program parts in the wind power system, in particular in the control device. Only the specific infeed is implemented in the infeed device.

BRIEF DESCRIPTION OF THE SEVERAL
VIEWS OF THE DRAWINGS

The invention will now be explained in greater detail below by way of example on the basis of embodiments with reference to the accompanying figures.

DETAILED DESCRIPTION

Figure 1:
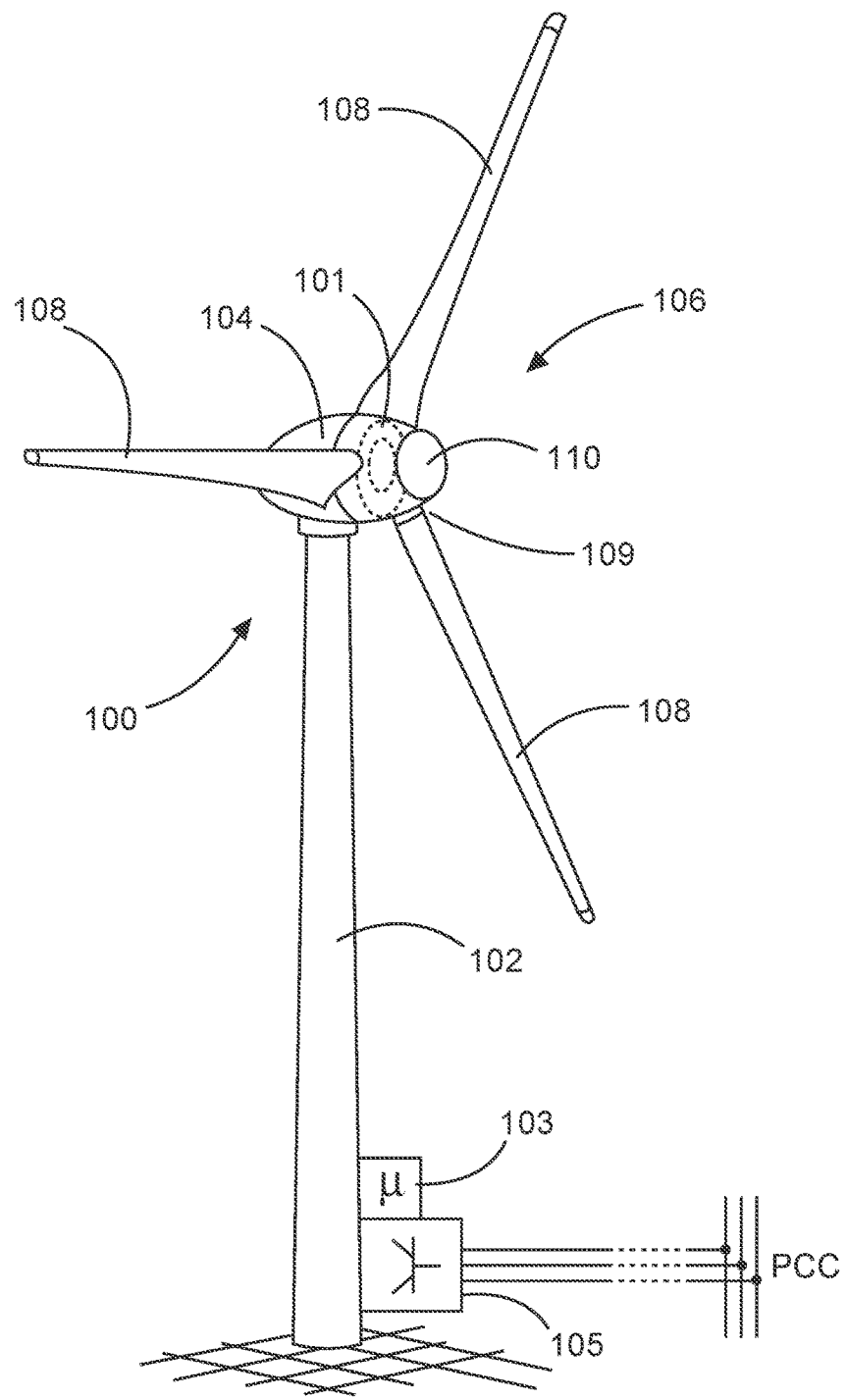
FIG. 1 shows a wind power installation in a perspective illustration.

FIG. 1 shows a schematic illustration of a wind power installation. The wind power installation 100 comprises a tower 102 and a nacelle 104 on the tower 102. An aerodynamic rotor 106 comprising three rotor blades 108 and a spinner 110 is provided on the nacelle 104. The aerodynamic rotor 106 is caused to effect a rotational movement by the wind during operation of the wind power installation and thereby also rotates an electrodynamic rotor of a generator, which is coupled to the aerodynamic rotor 106 directly or indirectly. The electrical generator is arranged in the nacelle 104 and generates electrical energy. The pitch angles of the rotor blades 108 can be varied by pitch motors on the rotor blade roots 109 of the respective rotor blades 108.

In this case, the wind power installation 100 comprises an electrical generator 101, indicated in the nacelle 104. Electrical power can be generated by means of the generator 101. An infeed unit 105, which can be configured as an inverter, in particular, is provided for feeding in electrical power. It is thus possible to generate a three-phase infeed current and/or a three-phase infeed voltage according to amplitude, frequency and phase, for infeed at a network connection point PCC. That can be effected directly or else jointly with further wind power installations in a wind farm. An installation controller 103, which may also synonymously be referred to as a control device, is provided for controlling the wind power installation 100 and also the infeed unit 105. The installation controller 103 can also acquire predefined values from an external source, in particular from a central farm computer.

Figure 2:
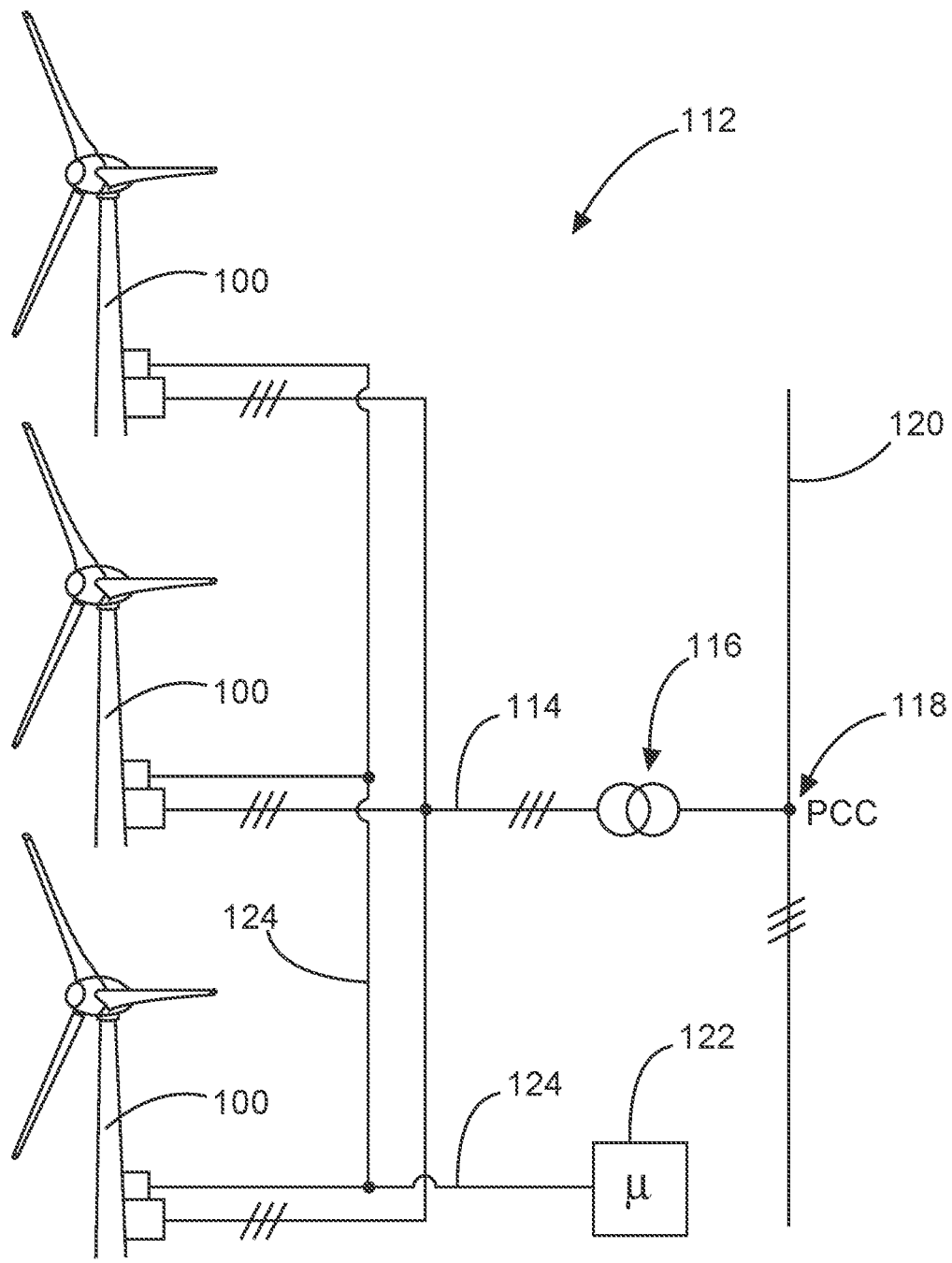
FIG. 2 shows a wind farm in a schematic illustration.

FIG. 2 shows a wind farm 112 comprising for example three wind power installations 100, which can be identical or different. The three wind power installations 100 are thus representative of basically an arbitrary number of wind power installations of a wind farm 112. The wind power installations 100 provide their power, namely in particular the generated current, via an electrical farm network 114. In this case, the respectively generated currents or powers of the individual wind power installations 100 are added and a transformer 116 is usually provided, which steps up the voltage in the farm in order then to feed it into the supply network 120 at the infeed point 118, which is also generally referred to as PCC. FIG. 2 is merely a simplified illustration of a wind farm 112. For example, the farm network 114 can be configured differently, with for example a transformer also being present at the output of each wind power installation 100, to mention just one different exemplary embodiment.

The wind farm 112 additionally comprises a central farm computer 122, which may synonymously also be referred to as a central farm controller or as a control device. Said computer can be connected to the wind power installations 100 via data lines 124, or in a wireless manner, in order thereby to exchange data with the wind power installations and in particular to acquire measured values from the wind power installations 100 and to transmit control values to the wind power installations 100.

Figure 3:
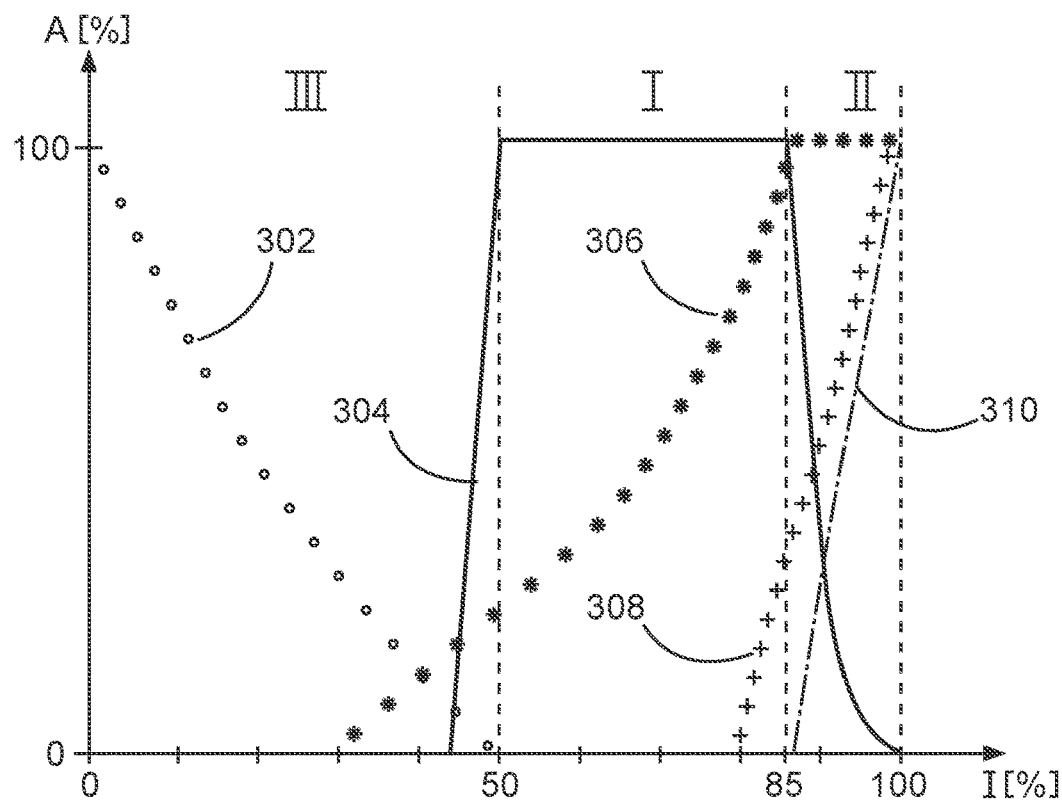
FIG. 3 shows a diagram illustrating the activation of various controls depending on a converter proportion.

FIG. 3 shows a diagram in which a converter proportion in percent is plotted by way of example on the abscissa. The ordinate represents a degree of activation of from 0% to 100%. This indicates that some controls can be activated to different extents. In particular, that can mean that controls of a weak activation, that is to say of a few percent, have a correspondingly weak controller gain, through to a maximum controller gain to be provided, which is indicated by 100%. In other cases, particularly in the case of the activation of voltage impressing, the degree of activation can show how many elements, in particular how many inverters, have the corresponding controls. Particularly for voltage impressing, provision can be made for one or more inverters to carry out voltage impressing. The maximum number of inverters to be provided for such voltage impressing then corresponds to the degree of activation of 100%.

In the example in FIG. 3, a converter proportion of 50% constitutes the first reference value, and a converter proportion of 85% constitutes the second reference value.

Consequently, here the lower proportion range lies in the range of 0-50%, the middle proportion range lies in the range of between 50% and 85%, and the upper proportion range lies in the range of 85-100%.

In the lower proportion range, in this case a damping of low-frequency oscillations is provided as damping control. The latter is shown by a graph 302. It is thus evident that this oscillation damping control 302 is provided only in the lower proportion range and its degree of activation decreases from 100% to 0% from a converter proportion of 0% up to a converter proportion of 50%. The oscillation damping control is thus only proposed if a large proportion of directly coupled synchronous generators as oscillatory systems is present in the network section and correspondingly determines the network behavior. The decrease of the degree of activation here can be proportional to an amplitude of a power signal connected in an oscillating manner. At 100%, this oscillating power amplitude thus has the maximum value, which can decrease down to zero.

For a frequency gradient control 304, the profile of its degree of activation is depicted in FIG. 3. Said frequency gradient control is thus proposed in the middle proportion range. It is activated to the extent of 100% there. Said frequency gradient control alters the power infeed depending on a frequency gradient. In this respect, the frequency gradient control prevents excessively large frequency gradients, and at least counteracts them.

Said frequency gradient control 304 is basically provided only in the middle proportion range. There are just transition ranges provided in which a degree of activation for the frequency gradient control rises from zero to 100% while still in the range of the lower proportion range and falls from 100% to zero in the upper proportion range. The degree of activation of 100% for the frequency gradient control 304 in the diagram in FIG. 3 means, in particular, that a gain factor between frequency gradients and power to be fed in depending thereon assumes a maximum value.

A graph 306 for a reserve control is depicted in FIG. 3. In the case of this reserve control, a reserve power is reserved as power reserve by the converter-based generator being operated in a manner restricted by a restriction power. In the case of a degree of activation of 100%, therefore, the most reserved power is provided. That can be for example 10% or 20% of the rated power of the converter-based generator, but can also be related to power that can currently be fed in by means of the converter-based generator. Staying with the one example, if here for example a maximum value of 20% is provided, a degree of activation of 100% means that 20% of the power is provided as reserve power, that is to say that the installation is operated in a manner reduced by 20%. If the degree of activation is 50%, then the installation is accordingly operated in a manner reduced only by 10%.

This reserve control 306 is thus provided with the maximum value for the upper proportion range. In the middle proportion range, the reserve control 306 can likewise be increased gradually as the converter proportion rises, in order then to reach the degree of activation of 100% upon transition to the upper proportion range. Consideration is also given to a reserve control 306 already being activated with a low degree of activation already in the lower proportion range.

Reference numeral 308 depicts a graph of an activation of an integral voltage control. The integral voltage control 308 is a control in which a power portion of the fed-in power is fed in depending on an integral portion of a voltage deviation, in particular is fed in proportionally to said integral portion. As a result, a voltage control, at least voltage stabilization or at least influencing, is achieved by means of the adapted power infeed. The integral portion provided for this purpose in the case of the integral voltage control is provided in particular for the upper proportion range. It can already begin in the middle proportion range in the case of a low degree of activation. The degree of activation here denotes a controller gain, which is maximal in the case of a degree of activation of 100%. Said controller gain can constitute in particular a proportionality factor between the integral proportion and the power additionally fed in depending thereon. This gain factor or proportionality factor is maximal in the case of a degree of activation of 100% and is zero in the case of a degree of activation of 0%. Here, too, consideration is given to multiplying the transfer function by the degree of activation. The same result as in the case of the adaptation of the gain factor can arise in the linear case.

The voltage control is proposed in particular in order to return the voltage to the rated voltage band again. It has been recognized as a problem that as the converter proportion rises, the sensitivity of the voltage in the network to reactive power changes rises and often there are no infeed apparatuses in the network which drive the voltage back into the band. The reason for that may be, in particular, that only a dynamic network support with an exclusively proportional component and dead band is present, which does not effectuate control at all in the case of deviations within the dead band and, in the case of deviations over and above that, does not achieve steady-state accuracy.

FIG. 3 additionally illustrates a voltage impressing mode by means of the graph 310. Said voltage impressing mode is provided in the upper proportion range and may also synonymously be referred to simply as voltage impressing or voltage impressing control. Preferably, as illustrated in FIG. 3, said voltage impressing is provided only for the upper proportion range and it is increased at the beginning of the upper proportion range, that is to say in the case of the smallest converter proportion of the upper proportion range, from a degree of activation of 0% to a degree of activation of 100% for a converter proportion of 100%.

The degree of activation means here, in particular, how many inverters operate in voltage impressing fashion in the voltage impressing mode. In the case of a degree of activation of 100%, the maximum number of inverters which, from all the converter-based generators of the network section, are potentially provided for voltage impressing thus operates in voltage impressing fashion. In one example, that can also mean, this being proposed as one preferred embodiment, that all inverters or converters operate in voltage impressing fashion in the case of a degree of activation of 100%. Preferably, however, not all inverters of the converter-based generators are provided for that, but rather for example only half of all inverters or converters, and in that case a degree of activation of 100% then corresponds to the case in which half of all inverters operate in voltage impressing fashion. It has been recognized that in the upper proportion range the proportion of directly coupled synchronous generators is very low, and is even zero in the case of a converter proportion of 100%, and the property of voltage impressing is therefore realized by the converter-based generators or a portion thereof.

Figure 4:
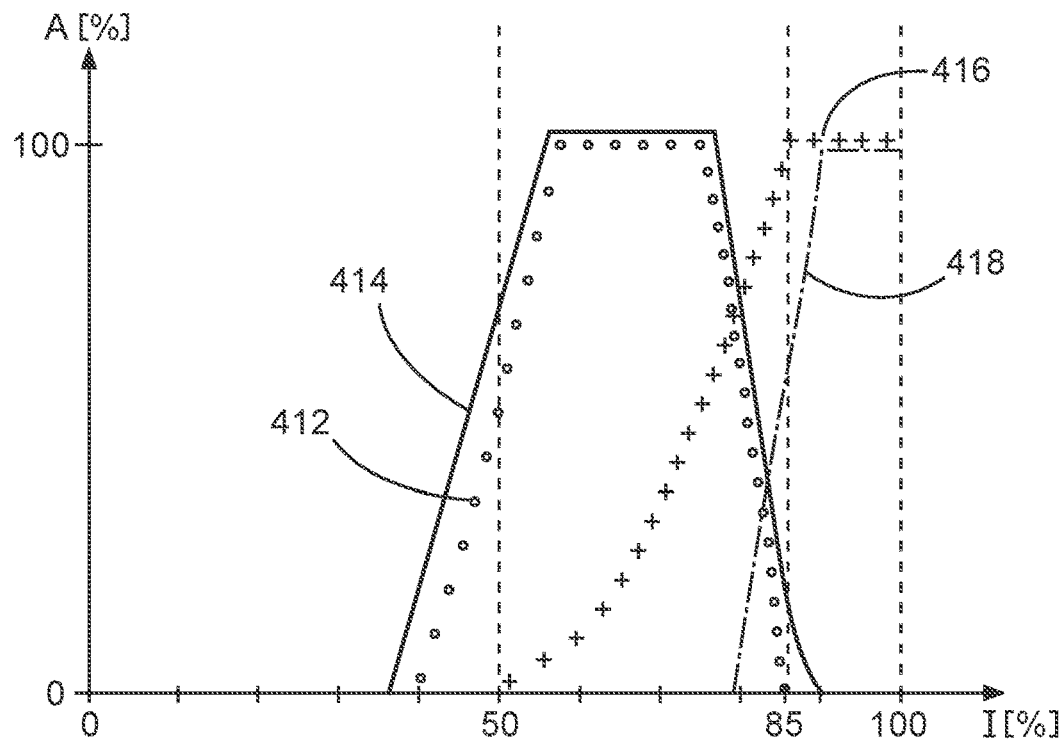
FIG. 4 shows a diagram for illustrating the activation of further controls depending on a converter proportion.

FIG. 4 shows a further diagram of control specifications, which are proposed in particular depending on the converter proportion and are also depicted depending on the latter. The diagram in FIG. 4 is set up like the diagram in FIG. 3 and for elucidation the first and second reference values have also been chosen as in the example in FIG. 3, namely with 50% and 85%, respectively. FIG. 4 differs from FIG. 3 in this respect only in that other control relationships are illustrated, which however can be activated simultaneously with the control relationships shown in FIG. 3. FIG. 4 was chosen in this respect only so as not to overburden FIG. 3.

FIG. 4 shows a degree of activation of an emulation function 412. Said emulation function 412 is activated in particular in the middle proportion range. A degree of activation of 100% can mean that a virtual centrifugal mass assumes a maximum value that is maximally provided for said emulation function. In the case of a degree of activation of 0%, therefore, the value of the virtual centrifugal mass is zero and the emulation function is deactivated as a result.

Furthermore, in FIG. 4 the graph of a power limitation function for rapid power limitation is illustrated and provided with the reference sign 414. This power limitation function 414 can also be referred to as a rapid power limitation function. In the case of a degree of activation of 100%, this power limitation function 414 has a maximum power limitation having the fastest possible value, that is to say the highest dynamic range that can be implemented. In particular, this may be, e.g., a value for which the power is reduced twice as rapidly as an input power of the corresponding converter-based generator can be reduced. In particular, a wind power system is provided here, and a degree of activation of 100% can mean that the power fed into the electrical supply network is reduced twice as rapidly as the wind power system can reduce the drawing of power from wind.

The rapid power limitation function 414 is likewise provided for the middle proportion range and can exhibit in particular an activation relationship, depending on the converter proportion, similar to that exhibited by the emulation function 412. Both attain full activation, that is to say the degree of activation of 100%, in the range of the middle proportion range.

In FIG. 4, a frequency-dependent power control 416 is also taken into account and its degree of activation depending on the converter proportion is represented by the graph 416. It controls a power that is additionally to be fed in with an amplitude that is proportional to a frequency deviation in accordance with a frequency-dependent gain factor. The frequency-dependent power control is provided, at least as full activation, only for the upper proportion range. A degree of activation of 100% can mean that a frequency-dependent gain factor that establishes a relationship between frequency deviation and power additionally fed in has a maximum value. The latter, down to a degree of activation of 0%, can correspondingly be reduced to zero. Thus, the frequency-dependent power control would then no longer be implemented. Preferably, such a low degree of activation of the frequency-dependent power control 416 can be provided in the middle proportion range. However, it is also possible for a frequency-dependent power control 416 also to be provided in the lower proportion range, in particular with correspondingly low gain, that is to say correspondingly low degree of activation, or large dead bands.

Preferably, it is proposed that an inertial angle control is activated with a degree of activation that has the same profile as the degree of activation 416 of the frequency-dependent power control. It has been recognized in particular that the inertial angle control is likewise a frequency-dependent control and in this case is required under conditions similar or identical to those for the frequency-dependent power control.

FIG. 4 also shows a preferred activation profile of an instantaneous reserve control 418. In the case of the instantaneous reserve control, a maximum activation of 100% can mean that a maximum gain factor is chosen, denoting a relationship between electrical power additionally fed in from kinetic energy and a frequency deviation. In this case, the value by which the network frequency lies below a lower frequency reference value is regarded as the frequency deviation. The activation of the instantaneous reserve control 418 is provided in particular for the upper proportion range and reaches the value of 100% here.

Only for reasons of depiction in the drawing, here the graph of the instantaneous reserve control 418 lies somewhat below that of the frequency-dependent power control 416. In actual fact, however, both graphs in the example shown are intended to reach the maximum value of 100%. The instantaneous reserve control 418 can be activated preferably exclusively in the upper proportion range. However, the activation can also extend into the middle proportion range, or start there, in particular with low degrees of activation, such that the degree of activation lies above 50% only in the upper proportion range, that is to say above the second reference value.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for feeding electrical power into an electrical supply network having a network voltage with a network frequency using a converter-based generator, comprising:
estimating a converter proportion of a network section of the electrical supply network, wherein the converter proportion represents a ratio of power fed in using converters to a total fed in power;
feeding the electrical power into the electrical supply network in a normal mode; and
activating at least one support control for supporting the electrical supply network, wherein:

the activating is performed depending on the converter proportion, the at least one support control is adjustable using a degree of activation, the degree of activation of the at least one support control is dependent on the converter proportion, the degree of activation has a value profile that is dependent on the converter proportion, the degree of activation has values in a range of 0 to 100% continuously or in more than two steps, a support control of the at least one support control is fully activated if the degree of activation associated with the support control is 100%, and the support control of the at least one support control is deactivated if the degree of activation associated with the support control is 0%.

2. The method as claimed in claim 1, wherein the converter-based generator is a wind power system.

3. The method as claimed in claim 1, wherein:
the support control is characterized by a transfer function, and wherein the degree of activation is applied as factor to the transfer function or if the support control is implementable by a plurality of controllers, a number of the plurality of controllers used for the support control is dependent on the degree of activation, such that the degree of activation is positively correlated with the number of the plurality of controllers, and/or
a proportion range for the converter proportion is classified in a lower, middle and upper proportion range, wherein
the lower proportion range is below a first reference value,
the middle proportion range is from the first reference value to a second reference value greater than the first reference value, and
the upper proportion range is above the second reference value.

4. The method as claimed in claim 3, wherein in particular the first reference value is in a range of 50-60%, and/or the second reference value is in a range of 80-95%.

5. The method as claimed in claim 3, wherein the first reference value and/or the second reference value are/is selected depending on a network property of the electrical supply network.

6. The method as claimed in claim 5, wherein the first reference value and/or the second reference value are/is selected depending on a load flow measure representing a maximum power flow between the network section and a remaining part of the electrical supply network.

7. The method as claimed in claim 3, wherein
in response to a maximum degree of activation being in the middle proportion range, an emulation function is activated, the emulation function reacting to a frequency change in the network frequency with a power change of the electrical power, wherein the power change as a reaction to the frequency change emulates a behavior of a synchronous machine coupled directly to the electrical supply network.

8. The method as claimed in claim 7, wherein a virtual centrifugal mass with adjustable mass moment of inertia is used for the synchronous machine, and wherein:
the degree of activation for adjusting the emulation function increases in the lower proportion range from a first value of a maximum of 10% as the converter proportion increases, reaches a maximum value in the middle proportion range, decreases again as the converter proportion increases further, and reaches a second value of a maximum of 10% in the upper proportion range, and/or the emulation function is adjusted by multiplication by the degree of activation, and/or the power change of the electrical power as the reaction to the frequency change has an amplitude that is at least double a magnitude of a power change of the electrical power of a frequency-dependent power control operating in parallel without emulation of the synchronous machine for the same frequency change, and/or for the power change of the electrical power as the reaction to the frequency change, no minimum frequency deviation of the network frequency from a reference frequency is predefined, or wherein a predetermined minimum frequency deviation is at least smaller than in a case of the frequency-dependent power control operating in parallel without emulation of the synchronous machine.

9. The method as claimed in claim 3, wherein
in response to a maximum degree of activation in the middle proportion range,
a power limitation function for rapid power limitation is implemented, wherein the power limitation function reduces the electrical power in response to a request signal or request criterion, and
the reduction of the electrical power is characterized by a reduction time constant, wherein the reduction time constant represents a time in which the electrical power is reduced by a rated power value, wherein the reduction time constant is less than 2 seconds.

10. The method as claimed in claim 9, wherein:
the degree of activation for adjusting the power limitation function increases in the lower proportion range from a first value of a maximum of 10% as the converter proportion increases, reaches a maximum value in the middle proportion range, decreases again as the converter proportion further increases, and reaches a second value of a maximum of 10% in the upper proportion range, and/or the power limitation function is multiplied by the degree of activation for adjusting the power limitation function, and/or with the use of a wind power system as the converter-based generator, the reduction of the electrical power is more rapid than a reduction of power generated from wind using the wind power system, and/or power is additionally consumed in the wind power system using a chopper circuit for reducing the electrical power, and/or the electrical power is reduced to a value below zero such that the wind power system draws power from the electrical supply network.

11. The method as claimed in claim 3, wherein in response to a maximum degree of activation in the middle proportion range, a frequency gradient control is activated, wherein the frequency gradient control alters the electrical power depending on a frequency gradient that quantitatively represent a frequency change per time.

12. The method as claimed in claim 11, wherein:
the frequency gradient represents a portion of the electrical power proportionally to the frequency change, and
the degree of activation for adjusting the frequency gradient control increases in the lower proportion range from a first value of a maximum of 10% as the converter proportion increases, reaches a maximum value in the middle proportion range, decreases again as the converter proportion further increases, and reaches a second value of a maximum of 10% in the upper proportion range, and/or the frequency gradient control is multiplied by the degree of activation for adjusting the frequency gradient control.

13. The method as claimed in claim 3, wherein:

in response to a maximum degree of activation in the upper proportion range a frequency-dependent power control is activated, in which the electrical power is altered depending on the network frequency in accordance with a control specification, and the control specification has a control gain and/or is characterized by a control speed, which are altered depending on the converter proportion and/or depending on a load flow measure, and/or in response to the maximum degree of activation in the upper proportion range and use of a wind power system, an instantaneous reserve control is activated in which depending on the network frequency, at values of the network frequency below a lower frequency reference value, kinetic energy is drawn from at least one rotating rotor and fed into the electrical supply network.

14. The method as claimed in claim 13, wherein:

the degree of activation for adjusting the instantaneous reserve control and/or the frequency-dependent power control has a first value of a maximum of 10% in the lower proportion range, increases in the middle proportion range from the first value as the converter proportion increases or increases only starting from a proportion range that is below the second reference value by a maximum of 10%, reaches a maximum value in the upper proportion range, and maintains the maximum value as the converter proportion further increases up to 100%, and/or the instantaneous reserve control or the frequency-dependent power control is multiplied by the degree of activation for setting the instantaneous reserve control or the frequency-dependent power control.

15. The method as claimed in claim 3, wherein:

in response to a maximum degree of activation in the upper proportion range, an inertial angle control is activated, wherein:
  the inertial angle control operates a reference system, in which a virtual centrifugal mass rotates with a rotational speed corresponding to the network frequency and is used to derive a reference signal with a reference frequency and a phase angle in relation to the network voltage, and
  the rotation of the virtual centrifugal mass follows a change of the network frequency with a delay function, such that the phase angle of the reference signal varies as the network frequency changes, and the inertial angle control controls the electrical power depending on the phase angle of the reference signal.

16. The method as claimed in claim 15, wherein:

the inertial angle control controls a portion of the electrical power proportionally to the phase angle, the virtual centrifugal mass is distinguished by a moment of inertia that is adjustable, the delay function has a ramp-up time constant that is proportional to the moment of inertia, the moment of inertia is chosen depending on an operating point of the converter-based generator or depending on the electrical power, and the degree of activation for adjusting the inertial angle control has a first value of a maximum of 10% in the lower proportion range, increases in the middle proportion range from the first value as the converter proportion increases, reaches a maximum value in the upper proportion range, and maintains the maximum value as the converter proportion further increases, and/or the inertial angle control is multiplied by the degree of activation for adjusting the inertial angle control.

17. The method as claimed in claim 3, wherein in response to a maximum degree of activation in the upper proportion range, a power infeed dependent on the network voltage is provided, which predefines the electrical power or a portion of the electrical power depending on a voltage deviation of the network voltage from a reference voltage.

18. The method as claimed in claim 17, wherein:

the reference voltage is a rated network voltage, a power portion of the electrical power proportional to the voltage deviation is predefined and fed in, a further portion of the fed-in power depending on an integral portion of the voltage deviation, is predefined and fed in, the degree of activation for adjusting the power infeed dependent on the network voltage has a first value of a maximum of 10% in the lower proportion range, increases in the middle proportion range from the first value as the converter proportion increases, and reaches a maximum value, and/or the power infeed dependent on the network voltage is multiplied by the degree of activation for adjusting the power infeed dependent on the network voltage.

19. The method as claimed in claim 18, wherein the degree of activation increases only starting from a proportion range that is below the second reference value by a maximum of 10%-20% and the degree of activation reaches the maximum value in the upper proportion range starting from a proportion range of 90%.

20. The method as claimed in claim 3, wherein:

in response to a maximum degree of activation in the upper proportion range, a reactive power infeed dependent on the network voltage is provided, which specifies a fed-in reactive power or a portion of fed-in reactive power depending on a voltage deviation of the network voltage from a reference voltage that is a rated network voltage, at least one portion of the fed-in reactive power depending on an integral portion of the voltage deviation, the degree of activation for adjusting the reactive power infeed dependent on the network voltage has a first value of a maximum of 10% in the lower proportion range, increases in the middle proportion range from the first value as the converter proportion increases, only starting from a proportion range that is below the second reference value by a maximum of 10%-20%, reaches a maximum value in the upper proportion range only starting from a proportion range of 90%, and/or the power infeed dependent on the network voltage is multiplied by the degree of activation for adjusting the reactive power infeed dependent on the network voltage.

21. The method as claimed in claim 3, wherein:

in response to a maximum degree of activation in the upper proportion range, a reserve control is activated, wherein a reserve power is reserved as power reserve by virtue of the fact that the converter-based generator is operated in a manner restricted by a restriction power, wherein a wind power system generates at a level of the restriction power less power from wind than is possible on the basis of prevailing wind to leave restricted operation and to increase the fed-in power by the restriction power or a portion of the restriction power, the degree of activation for adjusting the reserve control increases in the lower proportion range from a first value of a maximum of 10%, as the converter proportion increases, further increases in value in the middle proportion range as the converter proportion increases, reaches a maximum value in the upper proportion range, and maintains the maximum value as the converter proportion further increases up to 100%, and/or the reserve control is multiplied by the degree of activation for adjusting the reserve control.

22. The method as claimed in claim 3, wherein:

in response to a maximum degree of activation in the upper proportion range, a voltage impressing mode is activated, wherein the converter-based generator has a plurality of inverters each generating a portion of the fed-in power and, upon activation of the voltage impressing mode, at least one of the plurality of inverters changes from current impressing operation to voltage impressing operation, the degree of activation for adjusting the voltage impressing mode has a first value of a maximum of 10% in the lower proportion range, has a second value of a maximum of 10% in the middle proportion range, and increases in the upper proportion range to a maximum value as the converter proportion increases, and/or a number of inverters or converter-based generators depending on the degree of activation are used for adjusting the voltage impressing mode.

23. The method as claimed in claim 3, wherein in response to a maximum degree of activation in the lower proportion range a damping control is activated, a low-frequency oscillation in the electrical supply network is detected, which represents an oscillation of an amplitude of the network voltage that has a lower frequency than a rated network frequency, a damping of the low-frequency oscillation detected is performed, the degree of activation for adjusting the damping control decreases in the lower proportion range in the case of a converter proportion of 0-10%, from a first value of at least 90% as the converter proportion increases, has a second value of a maximum of 10% in the middle proportion range, and has a third value of a maximum of 10% in the upper proportion range, and/or the damping control is multiplied by the degree of activation for adjusting the damping control.

24. The method as claimed in claim 3, comprising:

detecting, of generators that do not use converters for power infeed, a dominant type of power plant of the network section;

distinguishing at least between, as the type of power plant of the generators that do not use converters for power infeed, a base load power plant and a regulation power plant or between a nuclear power plant, a coal-fired power plant, a gas-fired power plant and a hydroelectric power plant;

identifying the dominant type of power plant, among the generators that do not use converters for power infeed, as a power plant capable of feeding the most power into the network section; and selecting the first or second reference values is selected and/or at least one supplementary control depending on the dominant type of power plant.

25. A wind power system for feeding electrical power into an electrical supply network having a network voltage with a network frequency, comprising:

a controller configured to determine a converter proportion of a network section of the electrical supply network, wherein the converter proportion represents a ratio of power fed in using converters to a total power fed in; and an inverter configured to feed the electrical power into the electrical supply network in a normal mode, wherein:

the controller is configured to activate at least one support control for supporting the electrical supply network depending on the converter proportion, the at least one support control is adjustable using a degree of activation, the degree of activation of the at least one support control is dependent on the converter proportion, the degree of activation has a value profile dependent on the converter proportion, the degree of activation has values in a range of 0 to 100% continuously or in more than two steps, a support control of the at least one support control is fully activated if the degree of activation associated with the support control is 100%, and the support control of the at least one support control is deactivated if the degree of activation associated with the support control is 0%.

* * * * *